May 9, 1950     R. O. SMITH     2,506,747
DEVICE FOR THE END-WELDING OF STUDS
Filed Feb. 16, 1948

INVENTOR.
ROGER OLOF SMITH
BY
LINTON AND LINTON
ATTORNEYS

Patented May 9, 1950

2,506,747

UNITED STATES PATENT OFFICE 2,506,747

DEVICE FOR THE END WELDING OF STUDS

Roger Olof Smith, Goteborg, Sweden

Application February 16, 1948, Serial No. 8,683
In Sweden June 18, 1946

Section 1, Public Law 690, August 8, 1946
Patent expires June 18, 1966

2 Claims. (Cl. 219—8)

The present invention relates to the electric butt-welding of metal objects and particularly to the butt-welding of metallic stud-like or the ends of bar-like members to surfaces of other metallic objects.

The object of the invention is to provide a device containing a fluxing material and easily applicable to the stud or the like before its welding to the other metallic object.

Figure 1:
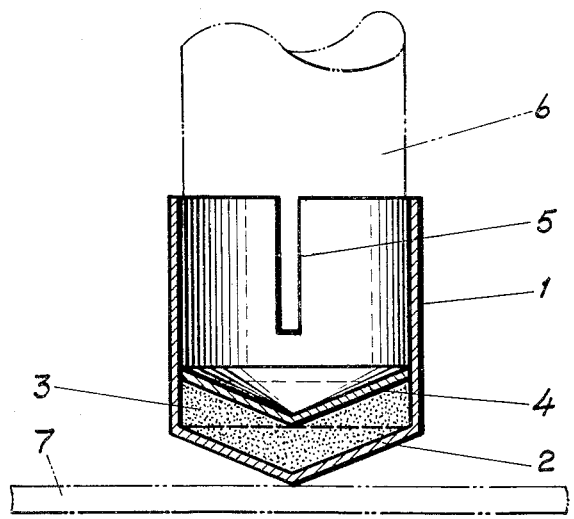
Figure 2:
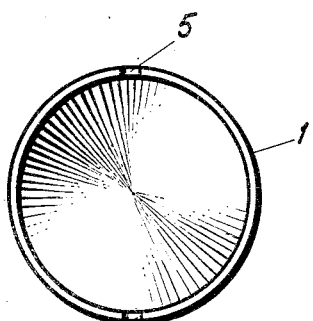

In the accompanying drawings Figure 1 is an axial section view of a device according to the invention, and Figure 2 is a plan view of the device.

Referring now more particularly to the device shown in Figures 1 and 2 the reference numeral 1 denotes a substantially cylindrical receptacle of relatively thin metal provided at one end with a conical bottom 2 and, at a distance therefrom, with a partition wall 4 pressed into the receptacle. The space or chamber between the bottom 2 and the wall 4 contains fluxing material, such as silicon, a mixture of iron and aluminium filings, or other suitable substances. At the other end of the receptacle there are provided two longitudinal slots 5 which divide said end of the receptacle into two flexible semi-cylindrical portions. The receptacle is applied to that end of the stud-like member 6 which is to be electric butt-welded to the surface of a metallic object 7 by inserting said end between said semi-cylindrical portions which frictionally retain the receptacle to the end of the stud-like member.

If the stud-like member 6 and the metal object 7 are electrically connected across the poles of a suitable source of current, and the point of the bottom 2 is brought into contact with the surface of the object 7, the stud-like member 6 will be welded to the object 7, the material of the receptacle 1 contributing to the bond created. The fluxing material 3 serves to create a perfect bond.

The invention is not limited to the embodiments above described and shown in the drawing but may be varied in details without departing from the spirit of it.

What I claim is:

1. A flux holder for use upon stud ends during welding thereof comprising a cylinder formed of an electrically conductive material and formed for a sliding fit upon the end of a stud to be welded, the bottom of said cylinder having a conical configuration, the upper portion of the side wall of said cylinder being formed with longitudinal slots extending from the top thereof providing flexible walls, a conically shaped partition mounted across the lower inner portion of said cylinder and spaced from the bottom thereof and a fluxing material positioned between said partition and said cylinder bottom.

2. A flux holder for use upon stud ends during welding thereof comprising a cylinder formed of an electrically conductive material and formed for a sliding fit upon the end of a stud to be welded, the bottom of said cylinder having a conical configuration, a conical partition formed for a press fit across and within the lower portion of said cylinder and extending substantially parallel to but spaced from the bottom thereof, and a fluxing material positioned between said partition and said cylinder bottom.

ROGER OLOF SMITH.

REFERENCES CITED

The following references are of record in the file of this patent:

UNITED STATES PATENTS

| Number | Name | Date |
| --- | --- | --- |
| Re. 22,411 | Nelson | Dec. 21, 1943 |
| 2,315,502 | Crecca et al. | Apr. 6, 1943 |
| 2,421,184 | Candy | May 27, 1947 |

FOREIGN PATENTS

| Number | Country | Date |
| --- | --- | --- |
| 365,302 | Italy | Nov. 30, 1938 |